United States Patent

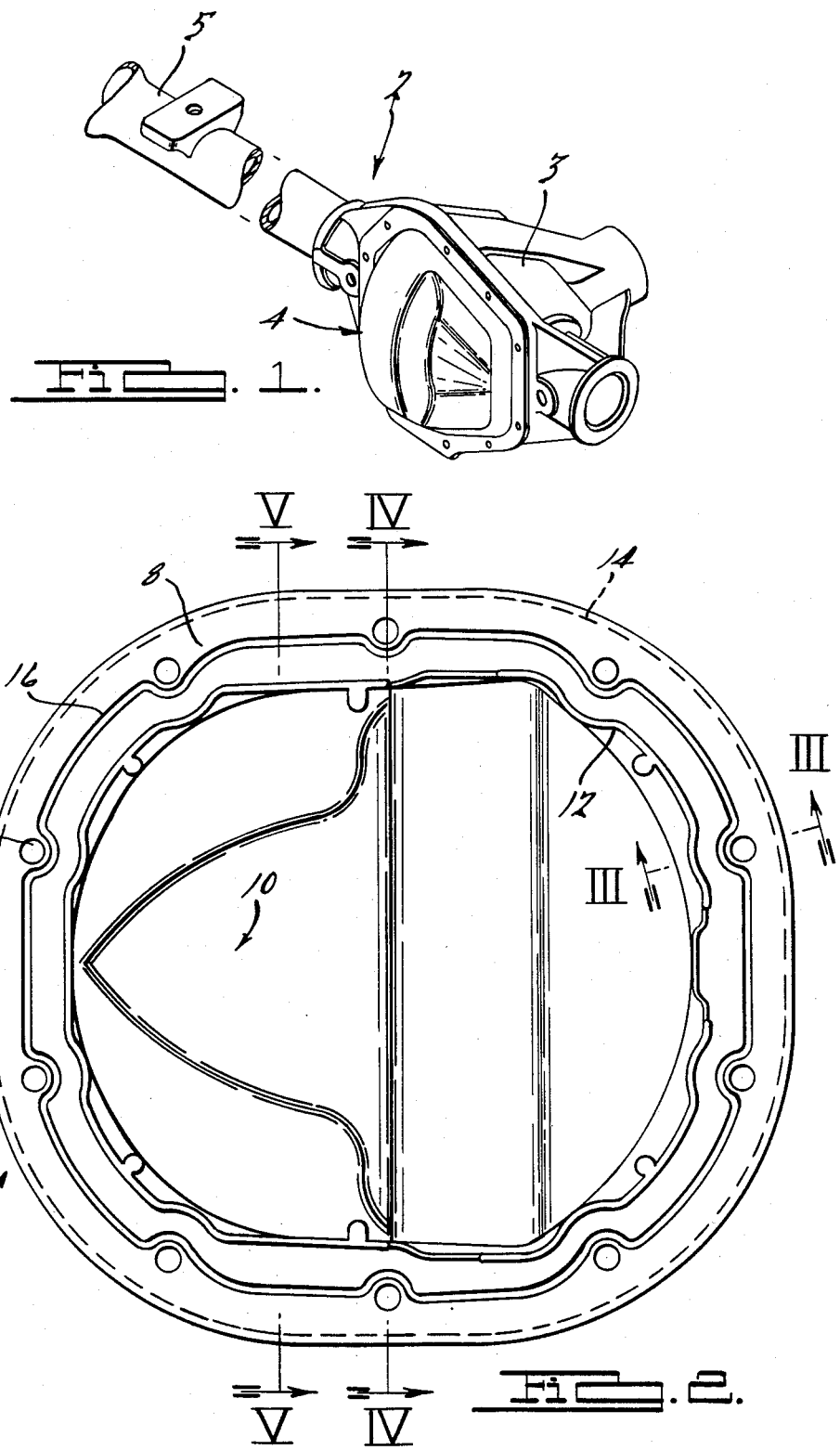

Hull

[11] Patent Number: 4,625,581
[45] Date of Patent: Dec. 2, 1986

[54] AUTOMOTIVE COMPONENT COVER
[75] Inventor: Neil A. Hull, Birmingham, Mich.
[73] Assignee: Ford Motor Company, Dearborn, Mich.
[21] Appl. No.: 690,278
[22] Filed: Jan. 10, 1985
[51] Int. Cl.⁴ .............................................. F16H 57/02
[52] U.S. Cl. ..................................... 74/606 R; 74/607
[58] Field of Search ............................. 74/606 R, 607; 277/235 B

[56] References Cited

U.S. PATENT DOCUMENTS

| | | | |
|---|---|---|---|
| Re. 18,925 | 8/1933 | Murray | 74/607 |
| 1,173,340 | 2/1916 | Cookingham et al. | 74/607 |
| 1,569,664 | 1/1926 | Mogford | 74/607 |
| 1,973,905 | 9/1934 | Leach | 74/607 |
| 3,901,103 | 8/1975 | Hufstader | 74/607 |
| 4,118,041 | 10/1978 | Futamura | 277/235 B |
| 4,301,775 | 11/1981 | Smart et al. | 123/196 R |
| 4,423,707 | 1/1984 | Sihon et al. | 123/52 M |

Primary Examiner—Albert J. Makay
Assistant Examiner—David W. Westphal
Attorney, Agent, or Firm—Jerome R. Drouillard; Roger L. May

[57] ABSTRACT

A cover for an automotive gearcase includes a mounting section contoured to match a sealing surface circumscribing the cavity to be sealed, a closure section to retain lubricant within the gearcase. The interior flange provides additional sealing capability for the cover, which is ideally made of plastic sheet molding compound.

3 Claims, 5 Drawing Figures

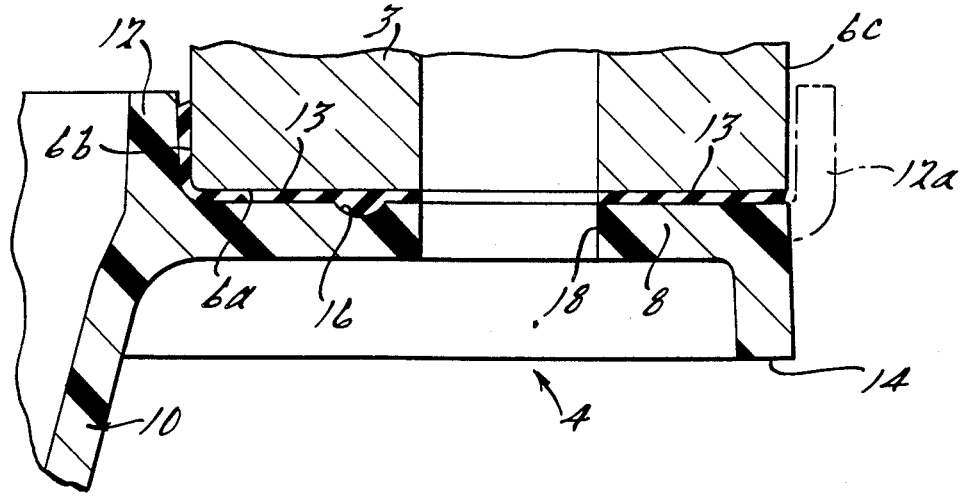

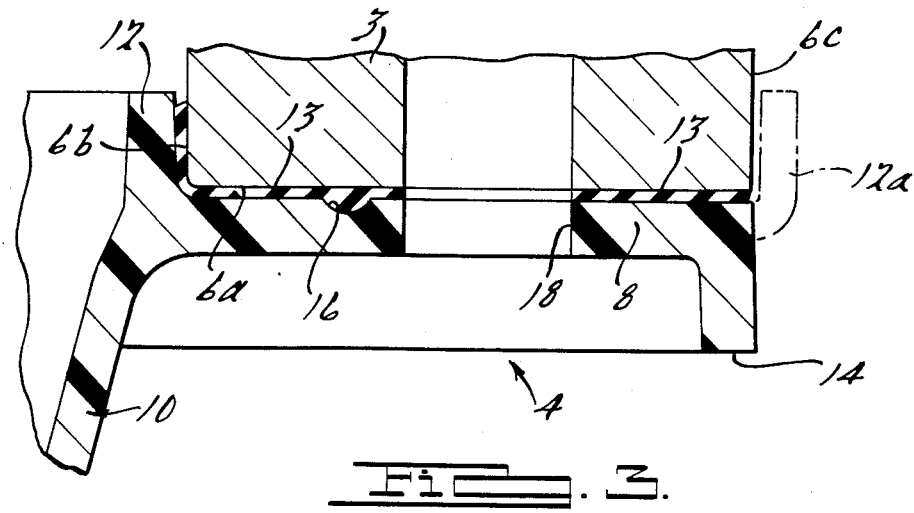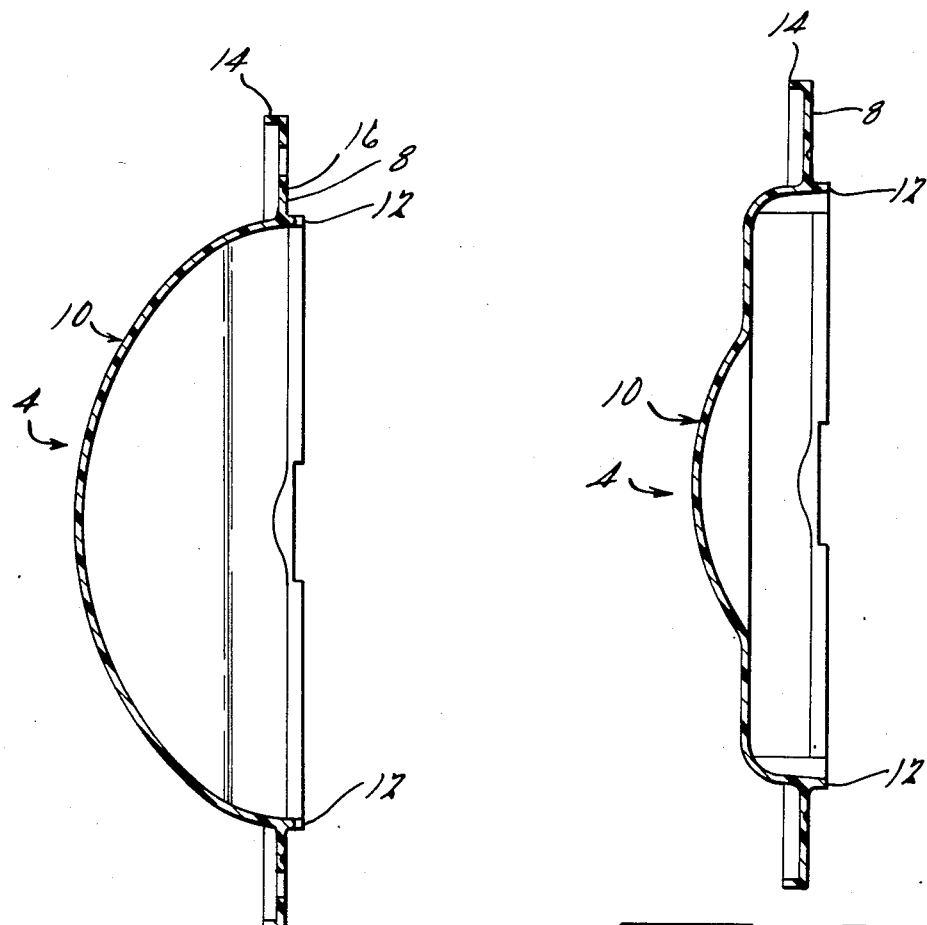

AUTOMOTIVE COMPONENT COVER

BACKGROUND OF THE INVENTION

1. Field of the Invention

This invention relates to covers for automotive vehicle components.

2. Description of Related Art

Access covers applied to automotive components such as differentials, transmissions, and engine crankcases have taken a variety of forms. Steel stampings have frequently been used for this purpose, as have iron or aluminum castings. The most commonly employed sealing systems with covers of this type are flat paper or cork gaskets or sealants such as silicone rubber. The present invention has particular application to the area of differential covers.

Sealing of steel differential covers to cast iron housings has presented several problems in the past. Where such sealing is accomplished by means of a viscous sealant such as silicone rubber interposed between the cover and the differential housing, the sealant is squeezed to a thin film and as such has very little bond strength. Attempts to solve this problem by applying the sealant in a thicker film have generally not been satisfactory because the film is subject to extrusion during pressure leak testing of the assembled housing.

The present invention includes the use of an internal sealing flange to provide superior sealing capability with gearcase covers of differing materials. A preferred embodiment comprises a cover of plastic sheet molding compound.

Plastic material has previously been used for engine oil pans. U.S. Pat. No. 4,423,707 discloses a stamped plastic oil pan for use with an internal combustion engine. This oil pan uses a sealing system comprised of a rubber gasket which is molded prior to being placed between the oil pan and the engine crankcase sealing surface. Finally, U.S. Pat. No. 4,301,775 discloses a system for fabricating a manifold for an internal combustion engine in which cast manifold halves are sealed by injecting sealant into exterior joints along opposed side faces.

SUMMARY OF THE INVENTION

According to the present invention, a cover for an automotive component having a cavity comprises a mounting section contoured to match a sealing surface circumscribing the cavity to which the cover is to be applied, a closure section attached to the mounting section, and a flange affixed to the inner contour of the mounting section and adapted to extend from the mounting section into the cavity such that sealant placed between the cover and the sealing surface will be retained between the flange and the sealing surface when the cover is applied to the component.

Preferably, the cover is unitary and comprised of plastic sheet molding compound. The preferred gearcase cover of the present invention offers several advantages over those commonly used in automotive practice. First, the preferred plastic cover is lighter in weight and offers superior corrosion resistance as compared to stamped steel covers. Second, the inner flange extending into the cavity of the gearcase to be sealed provides redundant sealing capability serving to solve sealing problems, a feature particularly useful with plastic covers since these sealing problems may be caused by the tendency of plastic to relax or creep with time when under a sustained load. Third, plastic is easily molded into intricate shapes unlike steel, which must generally be stamped and therefore is inherently limited as to the shapes it may take.

BRIEF DESCRIPTION OF THE DRAWINGS

FIG. 1 is a perspective view of an automotive axle assembly using a gearcase cover of the present invention.

FIG. 2 is a plan view of the interior side of the gearcase cover shown in FIG. 1.

FIG. 3 is a partial cross section on an enlarged scale taken along the line III—III in FIG. 2.

FIG. 4 is a cross section taken along the line IV—IV in FIG. 2.

FIG. 5 is a cross section taken along the line V—V in FIG. 2.

DETAILED DESCRIPTION OF THE PREFERRED EMBODIMENT

As shown in FIG. 1, the gearcase cover of the present invention may ideally be employed as part of an automotive axle assembly. In such usage, gearcase cover 4 will be applied to differential housing 3. The gearcase cover thus encloses the differential gears or other power transmission components (not shown). The cover is attached with a plurality of bolts extending through bolt holes 18 as shown in FIG. 2. The axle assembly shown in FIG. 1 is of conventional beam design and includes axle housing tubes 5 (one is shown) extending from the differential housing.

As shown in FIGS. 2–5, gearcase cover 4 comprises mounting section 8 which is generally planar and is contoured to match sealing surfaces 6a and 6b of the housing. As shown in FIG. 3, these sealing surfaces comprise a planar surface 6a and an interior surface 6b formed as part of the gearcase access port which is to be enclosed by the cover of the present invention. Closure section 10 is attached to mounting section 8 and serves to enclose the gearcase. Closure section 10 thus serves to contain any lubricant confined within the gearcase.

Flange 12 runs continuously around the inner contour of mounting section 8 and extends from mounting section 8 into the cavity which is to be sealed. As shown in FIG. 3, sealant 13 placed between mounting section 8 and sealing surface 6a will be caused to flow between flange 12 and sealing surface 6b as well as between mounting section 8 and external sealing surface 6a. It has been found that the retention of sealant 13 between sealing flange 12 and sealing surface 6b greatly enhances the sealing of cover 4 to gearcase 3.

Gearcase cover 4 additionally comprises external flange 14 which provides added structural strength to the cover, and sealant groove 16 which serves to trap additional sealant so as to provide the effect of an "O-ring" between mounting section 8 and sealing surface 6a. The gearcase cover of the present invention is ideally suited for use with silicone rubber sealers.

In the event that additional sealing capability is desired, a second, outer, sealing flange 12a may be provided. This external counterpart to flange 12 would serve to trap sealant between itself and sealing surface 6c (FIG. 3).

The gearcase cover of the present invention is preferably made of plastic sheet molding compound comprising glass fiber filled thermosetting polyester resin. Other sheet molding compounds and plastic molding compounds and techniques may provide alternatives to the prescribed sheet molding compound. The cover could, for simple configurations, be made of stamped sheet metal as well. The cover of the present invention is suitable for use in not only automotive differentials but also with other gearcase covers such as those used with transmissions, engine crankcases and other covers such as engine rocker arms covers, wiper motor covers and the like. Additional variations and modifications of the present invention are possible without departing from the spirit and scope which is defined by the appended claims.

I claim:

1. A cover for an automotive component comprising:
   a mounting section contoured to match a sealing surface of said component circumscribing the cavity to which said cover is to be applied;
   a closure section attached to said mounting section; and
   generally parallel inner and outer flanges fixed to the inner and outer contours of said mounting section with said inner flange adapted to extend into said cavity and said outer flange adapted to extend parallel to and in the same direction as said inner flange such that sealant placed between said mounting section and said sealing surface when said cover is applied to said component will be retained between said flanges and said sealing surface as well as between said mounting section and said sealing surface.

2. The cover of claim 1 comprising a plastic material.

3. The cover of claim 2 comprising sheet molding compound.